Figure 1:
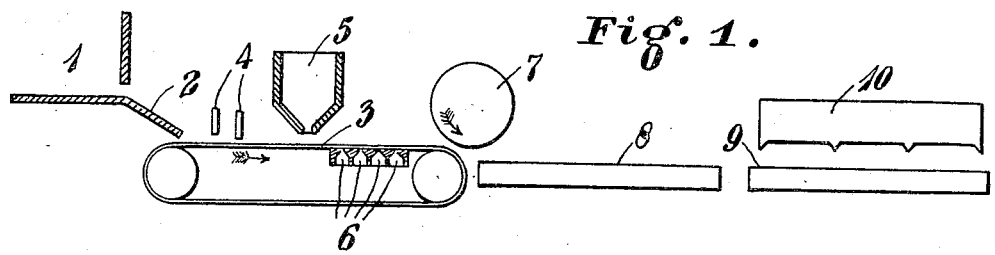

Jan. 10, 1933.  W. J. MOELLER  1,893,783
ASBESTOS CEMENT BUILDING MATERIAL
Filed June 25, 1928

INVENTOR.
William J. Moeller
BY
ATTORNEY.

Patented Jan. 10, 1933

1,893,783

UNITED STATES PATENT OFFICE

WILLIAM J. MOELLER, OF MOUNT HEALTHY, OHIO, ASSIGNOR TO THE PHILIP CAREY MANUFACTURING COMPANY, A CORPORATION OF OHIO

ASBESTOS CEMENT BUILDING MATERIAL

Application filed June 25, 1928. Serial No. 288,085.

My invention relates to asbestos cement building material.

Asbestos cement building material as heretofore manufactured has been either of the natural color of the mixture of hydraulic cement and asbestos, or has been colored by the addition in the mixture of a pigment which colored the product throughout. Attempts have also been made to embed slate regularly arranged with respect to the plane of the surface by mixing the asbestos and cement, spreading it over a surface, applying the slate and then the water after which pressure is applied to embed the slate and remove the water. None of the methods or products heretofore made by these methods were successful as it was always found that the surface would discolor or fade after exposure of the product to the weather due to the free lime in the cement coming to the surface, causing a film over the product. This free lime caused the pigment product and the slate product, in which the slate as a result of the method of production was slightly below the plane of the surface, to take on the color of the free lime which came to the surface. In the case of the slate so produced the film would extend over the slate particles.

I have discovered a process of manufacture in which the hydraulic cement, asbestos and water are first mixed to form a homogeneous mass which is spread over a support, forming a mass of even thickness, and then mineral particles or granules of one or more colors are irregularly applied to a portion of the surface of the wet mass. I then by removing a portion of the moisture form on a cylinder a series of laminations, the first lamination being formed with that portion of the mass upon which the granules have been placed so that the granules are in contact with the cylinder. The laminated sheet after the desired number of laminations are formed is then removed from the cylinder and placed on a flat surface so that the mineral particles are on top. This sheet may be then cut or trimmed to desired size or form and then cured in the course of which the adjacent plies become so intimately amalgamated that a relatively integral sheet is formed. This produces a product in which the surface has a plurality of colors formed by irregularly shaped and irregularly arranged particles separated by areas of asbestos cement arranged in minute planes at various angles to each other so that the result is an uneven surface. The areas between the mineral particles consist largely of elevations and valleys, in which the elevations are like the apex of a cone. The result of this surface formation is that the irregularly shaped and irregularly arranged, with respect to the plane of the surface particles are held in the product so that a portion of a particle is exposed and gives an area of the color of the granules, while the asbestos cement forms uneven areas, between the granules, of different color to the granules. This construction affords areas of asbestos cement between particles or granules of mineral that by reason of their surface formation permit free lime to arise to the surface of these areas, form a film over same and remain there until washed or weathered away by exposure to the weather. This free lime film by reason of the minute hills and valleys in the areas of asbestos cement between particles or granules of mineral remains in the valleys and covers only the areas of asbestos cement without flowing over the mineral of different color and as a result the product retains the color of the mineral particles in contrast to the asbestos cement areas coated with a film of free lime. As the asbestos cement in its natural color and the free lime are about the same shade, the film of lime on these areas is not objectionable.

This process also enables me to manufacture a highly satisfactory product at a lower cost than heretofore.

Figure 2:
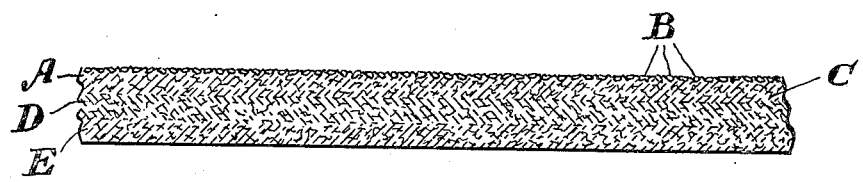

In the drawing I have shown in Fig. 1 a diagrammatic sketch illustrating my process. Fig. 2 is a cross section of my building material and Fig. 3 is an enlarged cross section of a fragment of my material.

Figure 3:
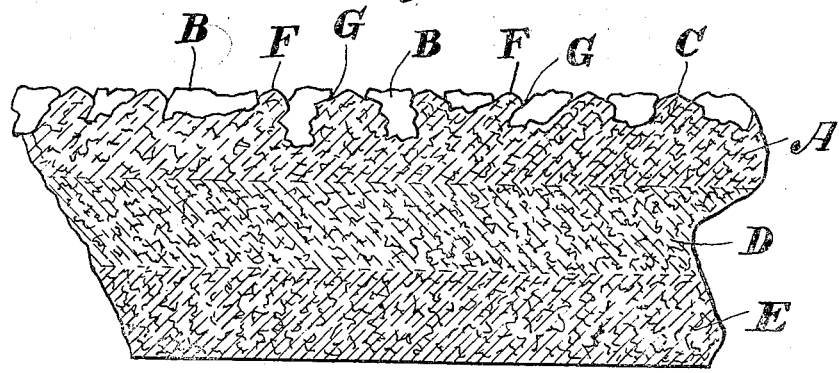

In the drawing referring to Figs. 2 and 3, A is the top lamination in which is held the particles or granules of mineral B preferably of a color different to the asbestos cement material C, composed of hydraulic cement and asbestos fibres, D is the second, and E the third, layer or lamination of asbestos cement material. While in the drawing these laminations A, D and E are shown with a line between them in the finished product these laminations are so intimately associated or amalgamated that the three form substantially a unit structure.

Between the particles or granules B the surface or areas of asbestos cement are provided with portions F formed like a cone apex and also with valleys G below the plane of the surface. These valleys G provide minute cavities into which the free lime deposits as it arises through the asbestos cement around the granules B.

In Fig. 1 I have shown a diagrammatic view illustrating the steps of my process in which 1 is a reservoir or mixer in which asbestos, hydraulic cement and water are mixed to form a homogeneous mass of the required density. When the desired mix has been formed it is fed over a chute 2 onto an endless porous web 3 suitably supported so as to move away from the chute 2. As the web 3 moves and carries with it the asbestos-cement-water mix the mass is distributed over the web by suitable doctor or comb blade 4 so as to form on the web a mass of suitable thickness. Having formed the mass over the web into the desired thickness it then passes below a hopper 5 which deposits particles or granules of mineral on the surface of the mass until an area equal to the circumference of the cylinder 7 has had mineral deposited on it when the hopper is closed so that no additional mineral is deposited. The web then passes over suction boxes 6 so arranged as to draw water, from the mass on the web, through the web. In drawing the water through the web the mineral granules are also drawn slightly into the mass. The mass is then taken up by and wound on a cylinder 7 with the mineral particles in direct contact with the surface of the cylinder. The mineral surfaced portion of the mass forms the first layer or lamination on the cylinder and the supply of mineral having been stopped as many additional layers may be wound in the cylinder, on top of the first as desired until the required thickness is obtained. Having formed the sheet of required thickness on the cylinder it is removed, placed on a flat bed or plate 8, from there it passes to a cutter bed 9 above which is arranged a cutter head 10 provided with cutters arranged to give desired size or form to the sheet. From the cutter the sheets are carried to a suitable moist curing room where they are left to cure and harden after which they are ready for use.

While I have referred to the use of particles or granules of mineral I would have it understood that particles of any material relatively large compared with the particles of dry cement used and of the desired color and weather resisting quality could be used such as copper, iron, brick, slate, etc.

I claim:

1. As an article of manufacture an integral sheet formed from a plurality of laminations, each lamination containing a mixture of fibre and cement materials; one of the laminations containing weather resisting particles of material of a color contrasting in color to the lamination and forming an exposable surface having areas formed by said particles and adjacent areas formed by the body of the top lamination.

2. As an article of manufacture a sheet composed of a plurality of laminations, each containing a mixture of fibre and cement materials; one of the laminations only containing, irregularly arranged, with respect to the plane of the surface of the lamination, weather resisting particles of mineral material of a color contrasting to the body of the laminations and forming with said laminations an exposable surface having a plurality of colors, said particles being arranged so as to provide exposed areas of said particles and adjacent areas of the top lamination.

3. As an article of manufacture an indurated sheet composed of a plurality of laminations, each containing a mixture of fibre and cement materials; one of the laminations only containing weather resisting granular mineral material of a color contrasting to the body of the laminations and forming an' exposable surface in a plurality of different planes and having exposed areas of said mineral and of the material of the lamination in which the material is contained.

4. As an article of manufacture a sheet composed of a plurality of laminations, each containing a mixture of fibre and cement materials; one of the laminations only containing exposed on its surface weather resisting particles of material of a color contrasting in color to the laminations and forming an exposable surface having a plurality of colors formed by exposed areas of said particles and intervening areas of the top lamination, said particles being arranged at different angles to the plane of the surface adjacent to the particles and to each other.

5. An article of manufacture a sheet formed from a plurality of laminations containing a homogeneous mixture of asbestos fibre and hydraulic cement, said laminations being amalgamated so as to form an integral sheet, one of the surface laminations only containing particles of weather resisting granular mineral materials of a color different from the color of the lamination proper, said particles being irregularly arranged with respect to the plane of the exposed surface of the laminations so as to create a slightly uneven exposed surface containing areas of different colors formed by exposed areas of said particles and adjacent areas of the laminated body in which the particles are held.

6. As an article of manufacture a sheet of asbestos cement material having a plurality of exposed areas on its surface, some of said areas formed with granular weather resisting materials, and adjacent areas formed by the asbestos-cement material, the last mentioned areas being formed so that portions of said areas are in a plane different from other portions of the same area.

7. As an article of manufacture a sheet of asbestos cement material having a plurality of exposed areas on its surface, some of said areas formed with granular weather resisting materials, and adjacent areas, separating said last mentioned areas formed by the asbestos-cement material, the last mentioned areas being formed so that portions of said areas removed from the granules are in an elevated plane with respect to the portions contacting with the granules.

In testimony whereof, I have signed my name to this specification.

WILLIAM J. MOELLER.